United States Patent [19]

Marin et al.

[11] 4,119,810

[45] Oct. 10, 1978

[54] PUSHBUTTON TELEPHONE APPARATUS WITH AUTOMATIC DIALING AND COMBINATIONAL SEQUENTIAL CONTROL SIGNALLING CAPABILITIES

[75] Inventors: Allan Marin, Evanston; Jack L. Bradbery, Evergreen Park, both of Ill.

[73] Assignee: Phone Devices Corporation, Chicago, Ill.

[21] Appl. No.: 722,394

[22] Filed: Sep. 13, 1976

[51] Int. Cl.² ............................................ H04M 1/42
[52] U.S. Cl. ................................ 179/90 K; 179/90 B; 58/152 T
[58] Field of Search .............. 179/90 K, 90 B, 90 BD, 179/90 AN, 2 DP, 2 TC; 58/152 T, 145 K, 23 A, 50 R

[56] References Cited

U.S. PATENT DOCUMENTS

| | | | |
|---|---|---|---|
| 3,760,121 | 9/1973 | Nissim | 179/90 K |
| 3,874,164 | 4/1975 | Bell | 58/152 T |
| 3,885,108 | 5/1975 | Zock | 179/90 B |
| 3,920,926 | 11/1975 | Lenaerts et al. | 179/90 AN |
| 3,932,709 | 1/1976 | Hoff et al. | 179/90 B |
| 3,943,288 | 3/1976 | Reed et al. | 179/90 K |
| 3,967,273 | 6/1976 | Knowlton | 179/90 K |
| 3,988,549 | 10/1976 | Merlin et al. | 179/90 K |
| 3,995,123 | 11/1976 | Wilson | 179/90 K |

Primary Examiner—Kathleen H. Claffy
Assistant Examiner—Gerald L. Brigance
Attorney, Agent, or Firm—Mason, Kolehmainen, Rathburn & Wyss

[57] ABSTRACT

An electronic telephone apparatus employs a pushbutton key array having multilevel switch contacts and a manually and automatically controlled signalling arrangement for output signalling in both the dial pulse and DTMF (Dual Tone Multifrequency) tone signalling formats. The signalling arrangement includes a memory storage and an automatic sequential dialing circuit to transmit various predetermined combinations of dial pulse trains of one or more digits and tone sequences useful in multiple PABX (Private Automatic Branch Exchange) networks, long haul microwave communication links between distant points and redialing of "found-busy" numbers. The memory arrangemnt is provided for both the dial pulse and tone signalling circuitry and is controllable by a sequence initiate stage and an inhibit stage whereby the station apparatus operator selects the signalling modes, initiates the signalling and determines the timing of the signalling such as the interdigital and intertone spacing of individual digits or groups of digits by selectively inhibiting the automatic signalling sequence.

7 Claims, 1 Drawing Figure

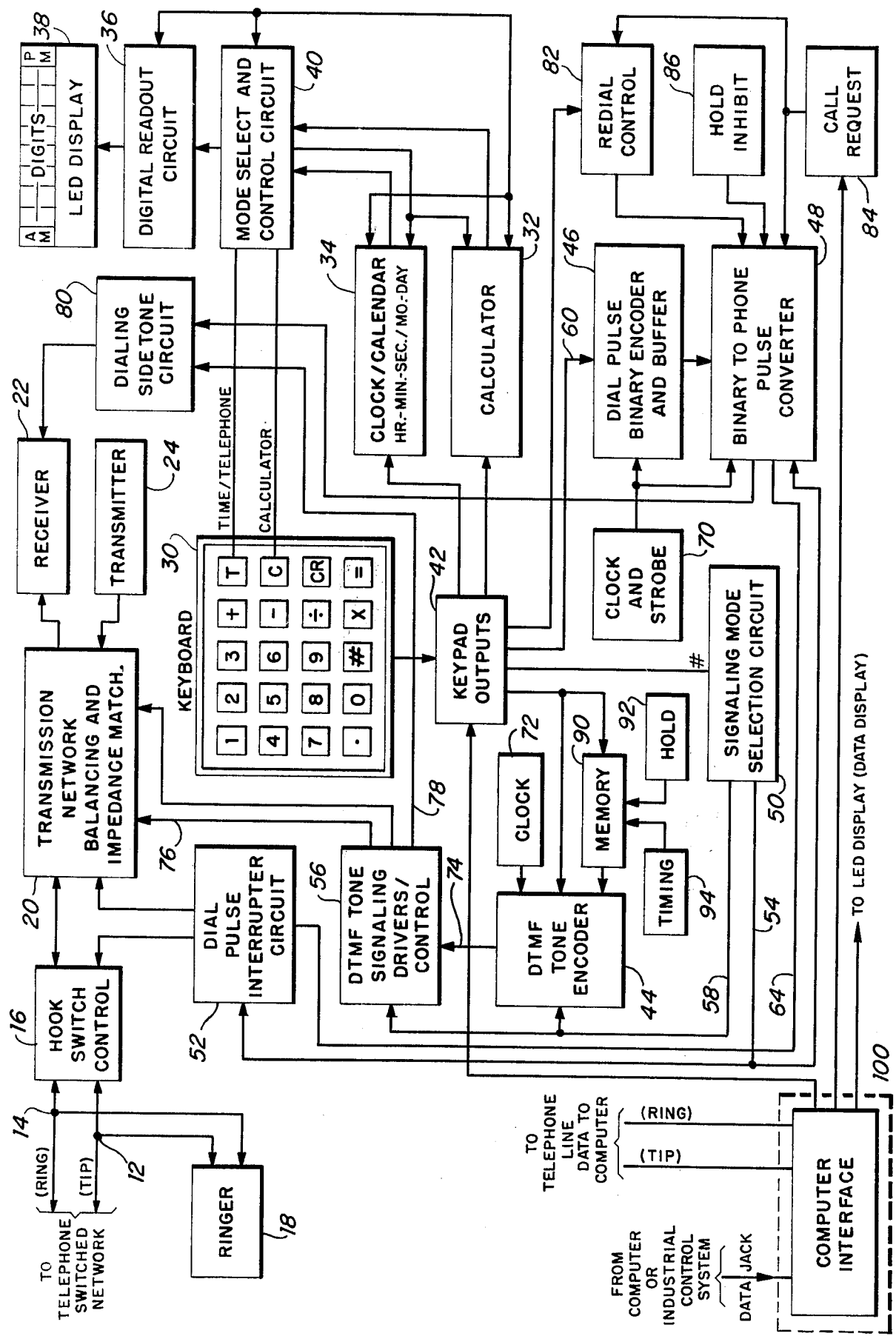

PUSHBUTTON TELEPHONE APPARATUS WITH AUTOMATIC DIALING AND COMBINATIONAL SEQUENTIAL CONTROL SIGNALLING CAPABILITIES

BACKGROUND OF THE INVENTION

A. Field of the Invention

The present invention relates to electronic telephone station apparatus and more particularly to a telephone instrument which is capable of signalling in both the dial pulse and DTMF (Dual Tone Multifrequency) tone signalling modes either manually or automatically to transmit various combinations of dial pulse digits and tode sequences.

B. Description of the Prior Art

Telephone station apparatus of the type shown, for example, in U.S. Pat. No. 3,932,709 which issued to D. G. Hoff, et al on Jan. 13, 1976, and U.S. Pat. No. 3,760,121 which issued to S. Nissim of Sept. 18, 1973, provide normal telephone communications, display various keyed-in digits from a key board array and arithmetic results of an interconnected calculator, and include provisions for the output signalling of stored digits.

The apparatus described in the aforementioned U.S. Pat. No. 3,760,121 utilized a frequency divider a decoder stage and a conventional multifrequency oscillator circuit to provide DTMF tone signalling from received BCD format signals from a high frequency display control stage and an assembling-storage stage.

A mixed dialing module is provided in the apparatus of the aforementioned U.S. Pat. No. 3,932,709 to permit tone or pulse dialing from a common keypad whereby tone dialing phones are automatically switched to rotary dialing whenever an internal "com-line", for example, is selected. The apparatus is useful to avoid total conversion of all instruments to tone dialing within a PABX network or a network where a majority of phones are of the rotary dial type, internal "com-lines" are used and a miniority of phones are to be provided with tone dialing capability for outside lines. A dial tone detector is provided to dial through an access code or codes when using a stored number dialer. The mixed dialing module is controlled by detecting the current flow at the line selector of "com-lines" due to relocated "A-1" leads. The apparatus therefore completes a call in either the rotary dial or the tone dialing mode. Function keys other than those in the normal pushbutton array are utilized such as a PM button (phone memory) and an RM button (recalls memory) wherein the PM button is effective to store a number, the RM button is effective to display the stored number and a DIAL BUTTON is utilized to place the call.

Although the telephone station apparatus of the prior art are generally satisfactory to accomplish their intended purpose, they are not generally suited to accomplish both dial pulse and DTMF tone signalling within a single signalling sequence and in either a manual or automatic mode under the control of the operator.

SUMMARY OF THE INVENTION

It is, therefore, a primary object of the present invention to provide a pushbutton telephone instrument which avoids one or more of the abovementioned disadvantages of the prior art.

It is another object of the present invention to provide a new and improved pushbutton telephone instrument capable of signalling in both the dial pulse and DTMF tone signalling formats either in a manual or automatic fashion under the control of the subscriber wherein both dial pulse and tone signalling are accomplished in various combinations within a single signalling sequence.

It is a further object of the present invention to provide a new and improved pushbutton telephone apparatus capable of automatic dialing sequences in the dial pulse and the DTMF tone format and providing a clock, calender, calculator and display function.

It is still another object of the present invention to provide a pushbutton telephone instrument capable of automatic output signalling in both the dial pulse and DTMF tone signalling modes and wherein the subscriber after initiation of the signalling sequence may determine the timing of the sequential signalling and selectively inhibit the signalling.

It is yet a further object of the present invention to provide a pushbutton telephone instrument wherein an operator may automatically or manually control the sequential output signalling in both the dial pulse and the DTMF tone signalling formats and wherein the operator is provided with dialing side-tone for dial pulse signalling and tone signalling to allow proper initiation and timing of the signalling such as is required in calling sequences involving multiple combination of dial tone, access code or authorization code signals.

These and other objects of the present invention are efficiently achieved by providing a telephone instrument employing a pushbutton key array and a manually and automatically controlled signalling arrangement for output signalling in both the dial pulse and DTMF tone signalling formats. The signalling arrangement includes a memory storage and an automatic sequential dialing circuit to transmit various predetermined combinations of dial pulse trains of one or more digits and tone sequences. A memory arrangement is provided for both the dial pulse and tone signalling circuitry that is controllable by a sequence initiate stage and an inhibit stage whereby the subscriber initiates a signalling sequence and selectively controls the timing of the sequential signalling. A dialing side-tone circuit is provided to inform the subscriber through the receiver of the instrument as to when outpulsing is occurring. A calculator, a digital clock, a daily calender and a digital display readout are also provided wherein the telephone instrument is operable in either a time-telephone mode or a calculate mode.

The invention, both as to its organization and method of operation together with further objects and advantages thereof, will best be understood by reference to the following specification taken in connection with the accompanying drawing.

BRIEF DESCRIPTION OF THE DRAWING

For a better understanding of the present invention, frequent reference will be made to the single appended drawing which is a block diagram representation of the telephone instrument of the present invention.

DETAILED DESCRIPTION OF THE PREFERRED EMBODIMENT

The electronic telephone apparatus of the present invention referring to the drawing is therein illustrated as connected to a telephone communication line pair including a TIP lead 12 and a RING lead 14 which connect the telephone apparatus to a switched network such as a central office, PABX or a key system. The telephone apparatus includes a conventional hook switch control circuit 16, ringer circuit 18, transmission network-balancing-impedance matching stage 20, handset receiver 22 and handset transmitter 24 which are interconnected in a standard or conventional fashion such as a standard K-500 telephone set or a GTE Automatic Electric 80-E telephone set.

The telephone apparatus of the present invention utilizes a pushbutton keyboard or keypad array referred to generally as 30 which includes a first numerical section arranged in a 3 × 4 matrix array as is conventional for pushbutton telephone apparatus having the usual 10 digit keys 0 through 9 and the symbols *, #. A second function section is arranged in a 2 × 4 matrix array adjacent the numerical 3 × 4 array to form an overall 5 × 4 array. The function keys are the arithmetic function operators +, −, ÷, ×, = and CLEAR which are utilized to control a calculator arrangement 32. Further a TIME/TEL (time and telephone) mode key and a CAL (calculate) mode key are provided to select the mode of the telephone apparatus.

In the time and telephone mode, the keyboard 30 functions to produce the input data utilized to generate output signalling as will be explained in detail hereinafter and a clock and calender arrangement 34 is effective to drive a digital readout stage 36 and display device 38 to display hours, minutes and seconds for a predetermined duration and the month and day for a predetermined duration on a cyclic basis. In the calculate mode, the keyboard 30 functions to provide numeric input data and arithmetic function control to the calculator 32 which is effective to drive the digital readout stage 36 and the display device 38. The TIME/TEL and CAL mode keys drive a mode select and control circuit 40 which controls the selective enablement of the clock and calendar arrangement 34 in the time and telephone mode and the calculator arrangement 32 in the calculator mode.

Each of the pushbuttons or keypads in the 5 × 4 array of the keyboard 30 includes a multilevel switch contact (multiple number of switch contacts) and the outputs of the switch contacts for the keypads are generally referred to as keypad outputs 42. The keypad outputs 42 are distributed with a first level of the switch contacts being utilized to provide data to the calculator arrangement 32, a second level being utilized for a selective reset or adjustment of the clock and calendar arrangement 34, and a third and a fourth switch contact layer utilized to provide numeric digit data inputs to a DTMF tone encoder stage 44 and a dial pulse binary encoder and buffer stage 46.

In accordance with an important aspect of the present invention, the DTMF tone encoder stage 44 is effective to produce tone output signalling when the telephone apparatus is in the DTMF tone mode and the dial pulse binary encoder and buffer stage 46 in combination with a binary to dial pulse converter stage 48 are effective to produce dial pulse output signalling when the telephone apparatus is in the dial pulse mode.

In a specific embodiment and in accordance with another important aspect of the present invention, the telephone apparatus is arranged to be in the dial pulse mode upon going off-hook and remain in the dial pulse mode until the # keypad is depressed whereupon the telephone apparatus is switched to the DTMF tone mode. The # key output is arranged to drive a signalling mode selection circuit 50 which controls the enablement of the binary to pulse converter stage 48 and a dial pulse interrupter circuit 52 by means of a dial pulse mode control line 54. The signalling mode selection circuit 50 controls the enablement of the DTMF tone encoder stage 44 and a DTMF tone signalling driver and control stage 56 by means of a DTMF tone mode control line 58.

The dial pulse binary encoder and buffer stage 46 converts the 2 out of 8 data input 60 from the keypad outputs 42 to a binary data output at 62. The binary data output 62 is utilized as the input of the binary to dial pulse converter stage 48 which produces a series of pulses at an output 64 in accordance with the binary number at the input 62. The output 64 controls the dial pulse interrupter stage 52 to open or break the line by means of the hook switch control circuit 16.

The dial pulse interrupter circuit 52 is a transistor stage in a specific embodiment arranged to be driven at the base lead by lines 64 with the collector to emitter junction being connected between the hook switch control 16 and the transmission path through network 20. A clock and strobe circuit 70 is provided to determine the dial pulse frequency of the binary to dial pulse converter stage 48. The binary to dial pulse converter also includes a memory for storing the binary digits representing a number or sequence of digits to be dialed automatically as will be explained in detail hereinafter.

The DTMF tone encoder stage 44 is effective to produce conventional tone signalling combinations according to the keypad outputs 42 which drive the 2 out of 8 data inputs of the encoder 44. A reference clock 72 provides a reference frequency which the tone encoder stage 44 utilizes to produce stable tone frequencies. The tone output line 74 of the tone encoder stage 44 drives the DTMF tone signalling driver and control stage 56 which is a transistor circuit arranged to provide a first tone output signal at 76 to the transmission network 20 and a second tone output signal at 78 to drive one input of a dialing side-tone circuit 80 which is connected to the receiver 22. A second input to the dialing side-tone circuit 80 is connected to a pulse train output of the binary to dial converter 48.

The dialing side-tone circuit 80 is implemented in a specific embodiment by providing a transistor for each of the tone signalling and dial pulse paths with each of the inputs to the side-tone circuit 80 being connected to the emitter of a separate transistor and the collector of each transistor being connected through a resistor to one side of the receiver 22. The base lead of each of the side-tone transistors is connected through a resistor to the opposite side of the receiver.

In accordance with an important aspect of the present invention, the binary to dial pulse converter stage 48 includes a memory stage into which the last number that was entered is stored until the next digit entry is accomplished. To this end, a redial control circuit 82 is provided with the * keypad input 42 providing a control signal to the redial control circuit 82 which is effective to cause the binary to dial pulse converter 48 to outpulse the number stored in the memory, the last number called. A call request circuit 84 is provided to clear the binary to dial pulse converter stage 48 to accept new digit inputs or to redial. The output of the call request circuit 84 is also connected to drive redial circuit 82. A hold circuit 86 is provided under the control of a function keypad to disable the outpulsing at line 64 of the binary to dial pulse converter stage 48 at the completion of the digit being outpulsed. The hold is removed and outpulsing continues when the keypad is released.

In accordance with yet another important aspect of the present invention, a memory stage 90 is provided to receive data inputs from the keypad outputs 42 and produce output data to the DTMF tone encoder stage 44. The memory 90 may be a combination of storage registers or a RAM circuit and in one specific embodiment stores the input data in the 2 out of 8 code as an 8 bit binary number for each digit inputted during a memory enable time period. In this manner, a memory having a capacity of 8 × 16 would be capable of storing data corresponding to 16 digits to be outputted as tone signalling. A hold circuit 92 responsive to the mode selection signal 58 and a function keypad is provided to disable further tone signalling until the keypad is released. A timing circuit 94 is utilized to control the memory to output digit data to the tone encoder circuit 44 on a basis consistent with conventional DTMF signalling techniques. The timing circuit 94 advances the digit data being outputted to encoder 44 by one digit upon each successive timing pulse produced at the output of the timing circuit 94.

In the operation of a specific embodiment and in accordance with an important aspect of the present invention, the telephone apparatus is brought off-hook. The appropriate digits are dialed out by sequencing the corresponding numerical keypads. At any point in the dialing sequence, the apparatus may be converted to provide tone signalling by actuation of the # keypad. If it is desired to use tone signalling with no dial pushing in the signalling sequence, the keypad is actuated upon going off-hook thereby providing tone signalling for all keyed-in digits. Automatic redialing of the last dial pulse number entered into the stage 48 is selectively enabled by actuation of the * keypad. When the apparatus is placed in an on-hook condition, the signalling mode selection circuit 50 is reset to the dial pulse mode. After the # keypad has been actuated to provide tone signalling for keyed in digits, depression of the * keypad enables the automatic redial and output signalling of the last number stored in the memory 90.

In accordance with yet another important aspect of the present invention and in accordance with another specific embodiment and after the apparatus is in the off-hook state corresponding to the dial pulse mode, automatic signalling or call processing may be accomplished by depressing the * keypad after dial tone is heard and thereafter depressing the numeral 1 keypad. The stored number in the memory of the binary to dial pulse converter 48 is outpulsed by means of dial pulse converter 48 is outpulsed by means of dial pulse signalling. The subscriber is aware of the outpulsing and also of the end of the outpulsing due to the provision of the dial pulse signalling side-tone to the receiver 22.

Thus, after the automatic dial out is initiated and before the signalling of the stored number is completed, the subscriber is aware that the call is progressing normally. In this example, the first automatically dialed number in the dial pulse signalling format may be the number of a service corporation which provides a long haul microwave carrier communication link between distant points wherein the service corporation is located in the local area of the subscriber end which may utilize only dial pulse signalling. Subsequent to accessing the local serivce corporation equipment, a second dial tone is received by the subscriber whereupon the numeral 2 keypad is depressed and the memory 90 is sequenced to program the tone encoder 44 to output the DTMF tone sequence combination corresponding to the number stored in the memory 90. This stored number corresponds to the 4 or 7 digit authorization or ID code of the subscriber to identify the subscriber to the computer of the service corporation. After the tone dialIng sequence has stopped, as ascertained by the absence of any tone signalling side-tone in the receiver, the subscriber continues to dial the desired phone number including area code, office code and called party code.

The two number stored in the memory, the phone number of the service corporation and the authorization code of the subscriber, remain in memory as long as the telephone apparatus is receiving supply voltages. To perform the initial programming or to store a new number, the subscriber goes off-hook, depresses the * key and while holding the * key depressed also depresses the numerical 1 key. This is effective to clear the dial pulse signalling memory in converter stage 48. Further, while still holding the * key depressed, the numerical Z key is depressed which clears the tone signalling memory 90. Now, the phone is placed on-hook.

To input new number into the memories, the subscriber goes off-hook, waits for dial tone, depresses the * key, depresses the numerical 1 key and dials in the desired dial pulse number. Next, after receiving the second dial tone, the numerical 2 key is depressed and the desired time signalling number or code is dialed. Now, before the actual phone number is dialed, the * key is depressed and then the desired area code, office code and called party code is dialed. The automatic call processing function may now be repeated with the new entered number as described hereinbefore.

Considering a further important aspect of the present invention, the hold controls 86 and 92 may be selectively utilized in such automatic dialing application where multi-dial tone or multi-area codes are utilized such as calling through a multiple network structure whereupon the subscriber may disable the output signalling of either the dial pulse or tone signalling stored numbers to await the reception of the appropriate dial tone before removing the hold and allowing the output signalling to continue.

A computer interface peripheral circuit 100 may be provided to be interconnected to transmit and receive data over the telephone line pair as well as to access the telephone apparatus to initiate a redial sequence of a stored number of initiate a clearing of an old stored number and the storage of a new number. The interface 100 may be connected to an alarm sensing device so as to initiate a dial out of a stored number when a specific condition is sensed.

The following parameter and circuit elements in a specific embodiment were found to be suitable in practicing the present invention although they should not be interpreted in a limiting sense:

BINARY ENCODER 46; MC14419 (Motorola Semiconductor) Products, Inc.
BINARY TO DIAL PULSE CONVERTER 48; MC14409 (Motorala)
DTMF TONE ENCODER 44; MC14410 (Motorola)
CLOCK/CALENDAR 34; CT7001 (Fairchild)
CALCULATOR 32; MM5737N (National Semiconductor)
DIGITAL READOUT 36; NSA1198 (National Semiconductor).

While there has been illustrated and described several embodiments of the present invention, it will be apparent that various changes and modifications thereof will occur to those skilled in the art. It is intended in the appended claims to cover all such changes and modifications as fall within the true spirit and scope of the present invention.

What is claimed as new and desired to be secured by Letters Patent of the United States is:

1. An electronic telephone apparatus comprising:
    keyboard means for entering of numeric information and function control commands including a plurality of individually operable keys, said plurality of keys comprising a standard multifrequency tone signalling array and a predetermined number of function control keys;
    signalling mode means responsive to operation of a first of said keys for selectively controlling the operation of said telephone apparatus in a dial pulse signalling mode and in a tone signalling mode, said selectively controlling signalling mode means being effective to place said apparatus in said dial pulse signalling mode when the apparatus is conditioned to an off-hook state;
    dial pulse means responsive to said selectively controlling signalling mode means and said keyboard means for generating dial pulse train signals, said generated dial pulse train including a number of pulses equal to the numeric designation of the key that is operated;
    tone signalling means responsive to said selectively controlled signalling mode means and said keyboard means for generating tone frequencies corresponding to the numeric designation of the key that is operated according to a preassigned code; and
    means enabled by said dial pulse train generating means for providing a dialing side-tone signal to the receiver element of said telephone apparatus when said dial pulse generating means is generating dial pulse train signals to inform the subscriber that outpulsing is occurring;
    said dial pulse generating means comprising dial pulse mode means for storing a representation of at least one previously entered digit of numeric information as entered from said keyboard means and responsive to operation of a second and a third of said keys, said dial pulse mode storing means selectively enabling said dial pulse generating means to sequentially generate said dial pulse train signals corresponding to said stored representation when said third key is operated and when said selectively controlling signalling mode means is in said dial pulse signalling mode;
    said tone frequency generating signal means comprising tone mode means for storing a representation of at least one previously entered digit of numeric information as entered from said keyboard means and responsive to operation of said second key and a fourth of said keys, said tone mode storing means selectively enabling said tone frequency generating means to sequentially generate said tone frequencies corresponding to said stored representation when said fourth key is operated, said selectively controlling signalling mode means, upon operation of said second and fourth keys, being effective to place said apparatus in said tone signalling mode.

2. The telephone apparatus of claim 1 further comprising signalling inhibit means responsive to a fifth one of said keys for inhibiting the enabling of said dial pulse generating means when said telephone apparatus is in said dial signalling mode and for inhibiting the enabling of said tone frequency generating means when said telephone apparatus is in said tone signalling mode.

3. The telephone apparatus of claim 1 wherein one of said function control keys is a TIME/TEL mode key and another of said function control keys is a CAL mode key, said telephone apparatus further comprising,
    display means,
    clock and calendar integrated circuit means for driving said display means to cyclically display the hours, minutes and seconds during a first portion of said cycle and to display the month and day during the remainder of said cycle when said TIME/TEL mode key has been operated, and
    calculator integrated circuit means being enabled when said CAL mode key has been operated for receiving numerical input data and function control data from said keyboard and driving said display means to display said numerical input data and to display the results of arithmetic operations in response to said function control data.

4. The telephone apparatus of claim 3 further comprising means for inhibiting said tone frequency generating means when said CAL mode key has been operated.

5. The telephone apparatus of claim 1 wherein said stored representation in said dial pulse mode storage means is a seven digit telephone number, and said stored representation in said tone mode storage means is an authorization identification code.

6. The telephone apparatus of claim 1 further comprising an alarm means operatively connected to said telephone apparatus for controlling said dial pulse mode storage means to generate said stored representation upon said alarm means detecting an alarm condition.

7. The telephone apparatus of claim 1 wherein said first and second keys are not any of the numeric keys in a standard multifrequency tone signalling array and said third and fourth keys are predetermined ones of the numeric keys of said array.

* * * * *